(12) United States Patent
Tobari et al.

(10) Patent No.: US 7,808,202 B2
(45) Date of Patent: Oct. 5, 2010

(54) BEAT-LESS CONTROLLER FOR PERMANENT MAGNET MOTOR

(75) Inventors: Kazuaki Tobari, Hitachiota (JP);
Yoshitaka Iwaji, Hitachinaka (JP);
Kiyoshi Sakamoto, Hitachinaka (JP);
Hajime Uematsu, Narashino (JP);
Masakazu Hase, Shizuoka (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 318 days.

(21) Appl. No.: 11/965,871

(22) Filed: Dec. 28, 2007

(65) Prior Publication Data

US 2008/0157710 A1 Jul. 3, 2008

(30) Foreign Application Priority Data

Dec. 28, 2006 (JP) .............................. 2006-353655

(51) Int. Cl.
*H02P 27/04* (2006.01)

(52) U.S. Cl. .................. 318/801; 318/807; 318/400.01

(58) Field of Classification Search .................. 318/801, 318/807, 400.01, 471, 400.02, 802, 811, 318/805, 727
See application file for complete search history.

(56) References Cited

U.S. PATENT DOCUMENTS 4,947,088 A * 8/1990 Kisakibaru et al. ............. 318/6
5,475,293 A * 12/1995 Sakai et al. ................. 318/802

FOREIGN PATENT DOCUMENTS

JP 2004-104898 4/2004

* cited by examiner

*Primary Examiner*—Karen Masih
(74) *Attorney, Agent, or Firm*—Antonelli, Terry, Stout & Kraus, LLP (57) ABSTRACT

In a driving system for an inverter that uses a diode rectifying circuit to convert a single-phase or three-phase AC voltage to a desired DC voltage and drives a permanent magnet motor, a DC-voltage pulsating frequency is estimated from a pulsating frequency setting calculated from the power supply frequency of an AC voltage and the detected current values of the inverter, and the resulting estimated pulsating frequency value and detected current values are used to correct the output voltage of the inverter.

10 Claims, 12 Drawing Sheets

BEAT-LESS CONTROLLER FOR PERMANENT MAGNET MOTOR

CLAIM OF PRIORITY

The present application claims priority from Japanese application serial No. 2006-353655, filed on Dec. 28, 2006, the content of which is hereby incorporated by reference into this application.

FIELD OF THE INVENTION

The present invention relates to a control method by which a low-frequency current beat phenomenon generated by DC voltage pulsation attributable to rectification by diodes is suppressed and thus torque ripple and noise of a motor are reduced in a driving system for an inverter that uses a diode rectifier to convert a single- or three-phase AC voltage to a DC voltage and drives a permanent magnet motor.

BACKGROUND OF THE INVENTION

First, why a current beat occurs will be described.

When a three-phase AC voltage is converted to a DC voltage by a full-wave rectifier that uses diodes, a pulsating ripple having a frequency six times as high as a power supply frequency input to the full-wave rectifier is generated in the converted DC voltage.

The pulsating ripple can be reduced by increasing the capacity of a smoothing capacitor connected to the output side of the rectifier. However, the power supply system is enlarged.

When a DC voltage includes a pulsating ripple, the three-phase output voltage and output current of the inverter include not only the operation frequency of the inverter but also a summed frequency component and subtracted frequency component between the pulsating component with a frequency six times as high as the power supply frequency and the operation frequency of the inverter.

When the operation frequency of the inverter is close to the pulsating component six times as high as the power supply frequency of the AC voltage, if the resistance in the motor driven by the inverter is small, a large pulsating current is generated due to the subtracted frequency component, generating the beat phenomenon in which the output torque of the motor pulsates.

In a method of suppressing the beat phenomenon as described in, for example, Japanese Patent Laid-open No. 2004-104898, a high-frequency component of a γ-δ axis current in a rotational coordinate system is detected, a three-phase current beat component is calculated, the calculated value is amplified, and a three-phase voltage command value is corrected.

SUMMARY OF THE INVENTION

In the method described in Japanese Patent Laid-open No. 2004-104898, however, a high-pass filter is necessary to extract the high-frequency component of the γ-δ axis current in the rotational coordinate system.

To improve the effect of suppressing the beat phenomenon when, for example, a different power supply frequency (50 or 60 Hz) is used or there is frequency error, a gain set for the high-pass filter and other parameters must be fine adjusted.

An object of the present invention is to provide a beat-less controller, intended for a permanent magnet motor, that can achieve beat-less control without adjustment even when, for example, a different power supply frequency (50 or 60 Hz) is used or there is frequency error.

In the present invention, a DC-voltage pulsating frequency is estimated from a pulsating frequency setting calculated from the power supply frequency of an AC voltage and a detected current value of an inverter, and the resulting estimated pulsating frequency value and detected current value are used to correct the output voltage of the inverter.

According to a preferred mode of the present invention, a low-frequency current beat generated due to DC voltage pulsation attributable to rectification by diodes can be suppressed, and thereby torque ripple and noise of the motor can be reduced.

DESCRIPTION OF THE PREFERRED EMBODIMENTS

Embodiments of the present invention will be described in detail with reference to the drawings.

First Embodiment

Figure 1:
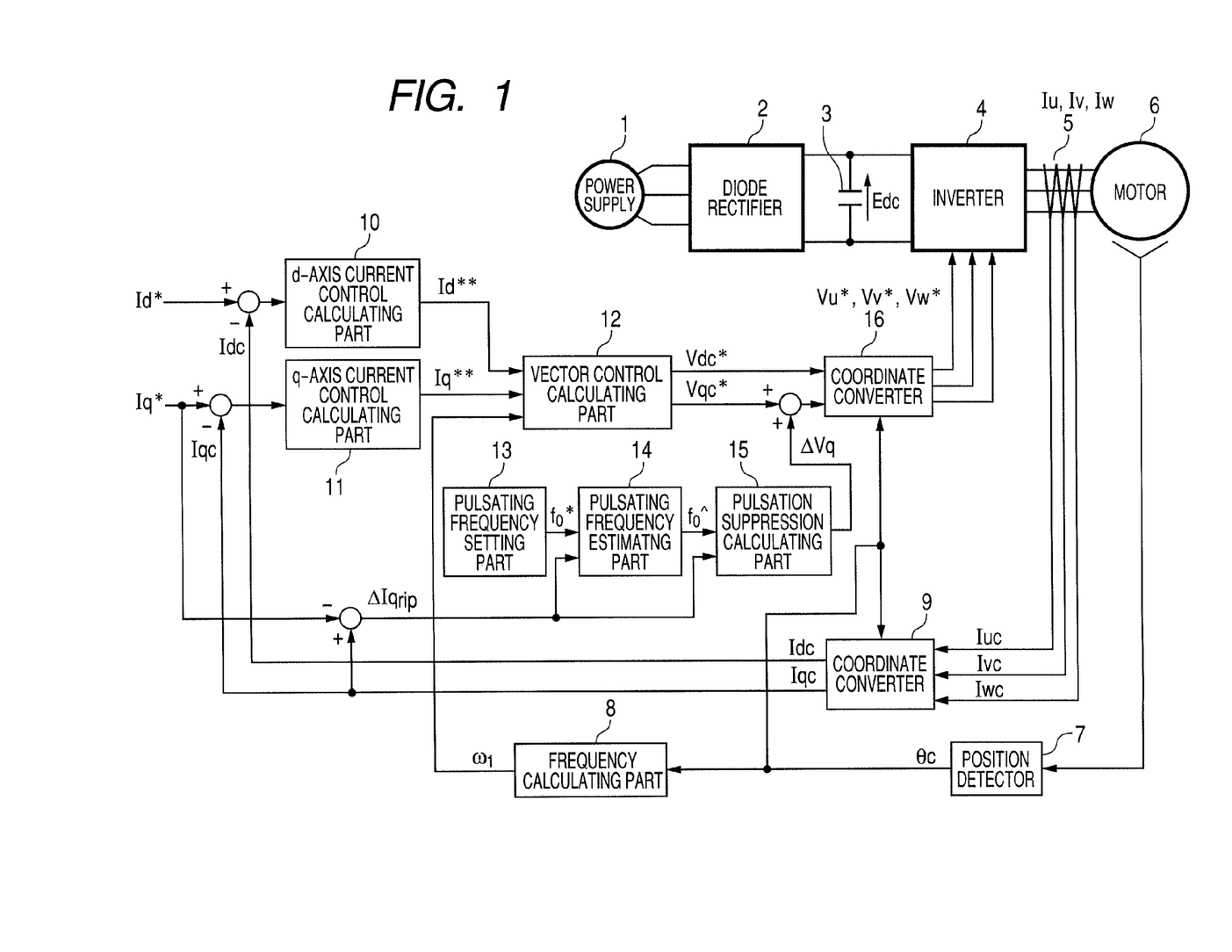
FIG. 1 is a block diagram showing the structure of a beat-less controller for a permanent magnet motor in an embodiment of the present invention.

FIG. 1 is a block diagram showing an exemplary structure of the permanent magnet motor controller in an embodiment of the present invention.

The AC power supply 1 outputs a three-phase AC voltage to a diode rectifier 2.

The diode rectifier 2 converts the three-phase AC voltage to a DC voltage.

The smoothing capacitor 3 smoothes the DC voltage, which is an output from the diode rectifier 2.

The inverter 4 outputs voltages proportional to a DC voltage Edc, which is an output from the smoothing capacitor 3, and three-phase AC voltage command values Vu*, Vv*, and Vw*, and changes output voltages and revolutions of a permanent magnet motor 6.

The current detector 5 detects the three-phase AC currents Iu, Iv, and Iw of the permanent magnet motor 6.

The permanent magnet motor 6 outputs a motor torque obtained by combining a torque component due to the magnetic flux of the permanent magnet and a torque component due to inductance of the winding of the armature.

The position detector 7 detects the position θ of the permanent magnet motor 6 and outputs a detected phase value θc.

The frequency calculating part 8 differentiates the detected position value θc from the permanent magnet motor 6 to yield a calculated frequency value $\omega_1$.

The coordinate converter 9 uses detected values Iuc, Ivc, and Iwc of the three-phase AC currents Iu, Iv, and Iw to output d-axis and q-axis detected current values Idc and Iqc, with reference to the detected position value θc.

The d-axis current control calculating part 10 outputs a second d-axis current command value Id** from a difference between a first d-axis current command value Id* and the detected current value Idc.

The q-axis current control calculating part 11 outputs a second q-axis current command value Iq** from a difference between a first q-axis current command value Iq* and the detected current value Iqc.

The vector control calculating part 12 outputs d-axis and q-axis voltage command values Vdc* and Vqc* according to electric constants of the permanent magnet motor 6, the second current command values Id and Iq, and the calculated frequency value $\omega_1$. The pulsating frequency setting part 13 sets information indicating that, for example, the three-phase power supply frequency is 50 or 60 Hz, and outputs a pulsating frequency setting $f_0^*$.

The pulsating frequency estimating part 14 outputs an estimated pulsating frequency value $f_0^{\wedge}$ according to the pulsating frequency setting $f_0^*$ and a difference $\Delta Iq_{rip}$ in current (a difference between the q-axis detected current value Iqc and the first current command value Iq*).

The pulsation suppression calculating part 15 uses the estimated value $f_0^{\wedge}$ and the difference $\Delta Iq_{rip}$ in current to output a q-axis pulsation compensating value ΔVq.

The coordinate converter 16 uses the voltage command value Vdc and a value obtained by adding the q-axis pulsation compensating value ΔVq to the voltage command value Vqc* to output the three-phase AC voltage command values Vu*, Vv*, and Vw*, with reference to the detected position value θc.

First, a basic method of controlling the voltage and phase will be described.

In a basic operation for voltage control, the d-axis current control calculating part 10 and q-axis current control calculating part 11 respectively use the first current command values Id* and Iq*, which are supplied from upstream, and the current detected values Idc and Iqc to calculate the second current command values Id and Iq, which are intermediate values used in vector control calculation.

The vector control calculating part 12 uses the second current command values Id and Iq, calculated frequency value $\omega_1$, and motor constant settings to calculate the voltage command values Vdc* and Vqc* indicated in equation (1), and controls the voltage command values Vu*, Vv*, and Vw* of the inverter 4.

[Equation 1]

$$\begin{bmatrix} Vdc^* \\ Vac^* \end{bmatrix} = \begin{bmatrix} R^* & -\omega_1 \cdot Lq^* \\ \omega_1 \cdot Ld^* & R^* \end{bmatrix} \cdot \begin{bmatrix} Id^{} \\ Ia^{} \end{bmatrix} + \begin{bmatrix} 0 \\ \omega_1 \cdot Ke^* \end{bmatrix} \quad (1)$$

where
R: resistance
Ld: d-axis inductance
Lq: q-axis inductance
Ke: induced voltage coefficient
*: setting In phase control, the position detector 7, such as a resolver or encoder, detects the position θ of the motor and obtains a detected position value θc.

The coordinate converters 9 and 16 use this detected position value θc to perform coordinate conversion as indicated by equations (2) and (3).

[Equation 2]

$$\begin{bmatrix} Vu^* \\ Vv^* \\ Vw^* \end{bmatrix} = \begin{bmatrix} 1 & 0 \\ 1/2 & \sqrt{3}/2 \\ -1/2 & -\sqrt{3}/2 \end{bmatrix} \cdot \begin{bmatrix} \cos(\omega_1 \cdot t) & -\sin(\omega_1 \cdot t) \\ \sin(\omega_1 \cdot t) & \cos(\omega_1 \cdot t) \end{bmatrix} \cdot \begin{bmatrix} Vdc^* \\ Vqc^* \end{bmatrix} \quad (2)$$

[Equation 3]

$$\begin{bmatrix} Idc \\ Iqc \end{bmatrix} = \frac{2}{3} \cdot \begin{bmatrix} \cos(\omega_1 \cdot t) & \sin(\omega_1 \cdot t) \\ -\sin(\omega_1 \cdot t) & \cos(\omega_1 \cdot t) \end{bmatrix} \cdot \begin{bmatrix} 1 & -1/2 & -1/2 \\ 0 & \sqrt{3}/2 & -\sqrt{3}/2 \end{bmatrix} \cdot \begin{bmatrix} Iuc \\ Ivc \\ Iwc \end{bmatrix} \quad (3)$$

The frequency calculating part 8 obtains the calculated frequency value $\omega_1$ according to equation (4).

[Equation 4]

$$\omega_1 = \frac{d}{dt} \cdot \theta_c \quad (4)$$

This completes the explanations of the basic operations for voltage control and phase control.

Next, control characteristics when the pulsating frequency setting part 13, pulsating frequency estimating part 14, and pulsation suppression calculating part 15, which are features of the present invention, are not provided will be described.

Figure 2:
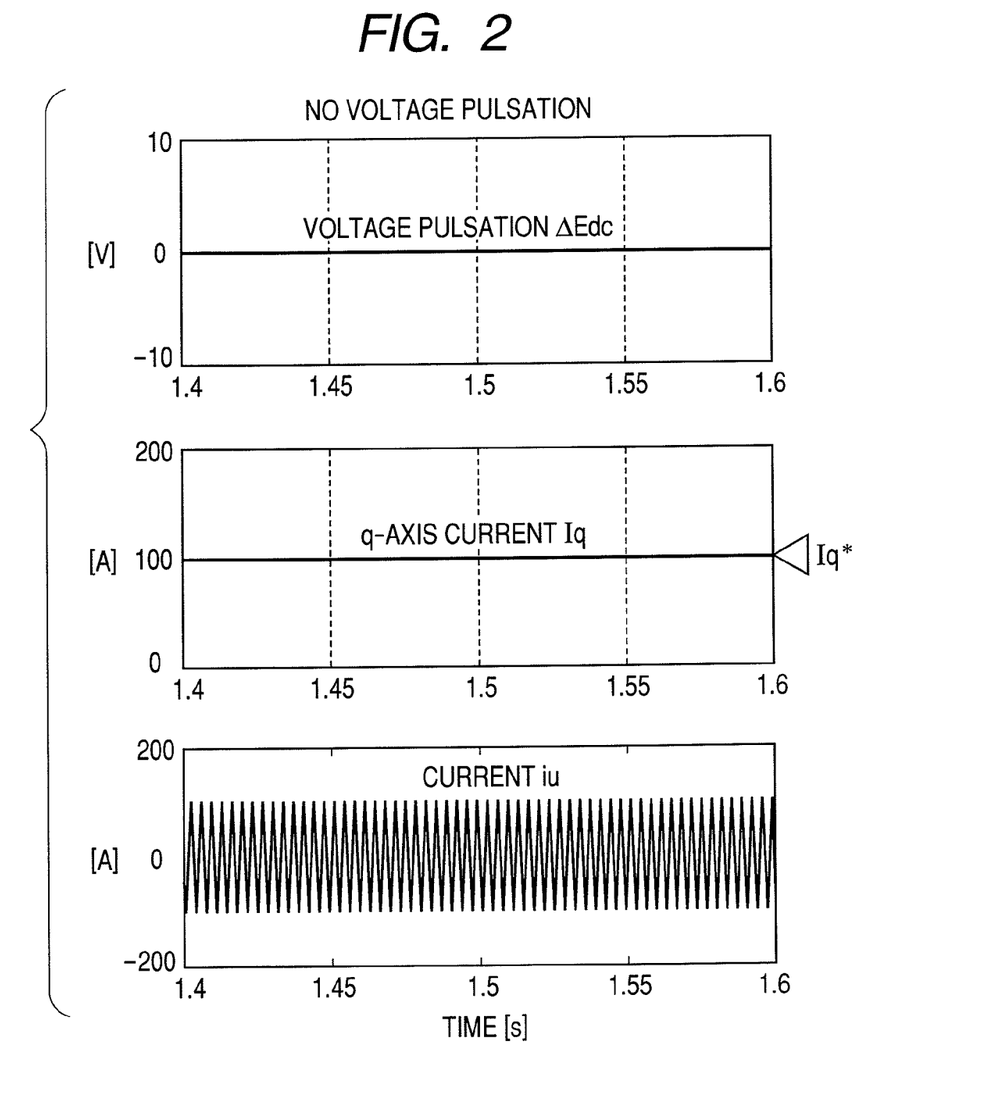
FIG. 2 is a drawing indicating current control characteristics when there is no voltage pulsation in a DC voltage.
Figure 3:
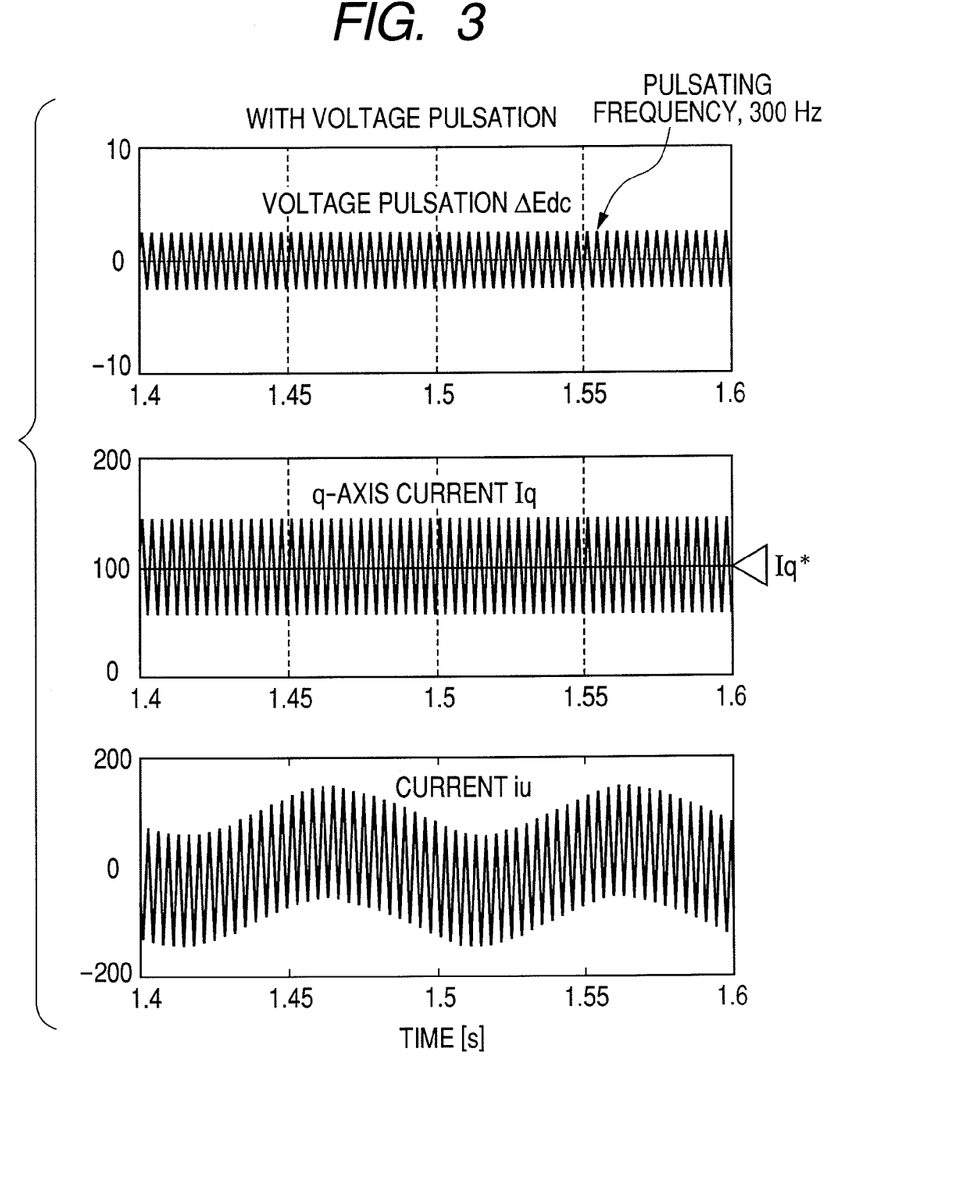
FIG. 3 is a drawing indicating current control characteristics when there is voltage pulsation in a DC voltage.

FIGS. 2 and 3 illustrate how DC voltage pulsation affects the control characteristics of the controller shown in FIG. 1.

In the characteristics in FIG. 2, there is no voltage pulsation (ΔEdc=0).

A q-axis current Iq and U-phase current iu at a motor rotation frequency of 290 Hz are indicated.

The drawing indicates that the q-axis current Iq matches the first q-axis current command value Iq*, 100 A, and is controlled stably. The peak value of the current iu is also 100 A.

In the characteristics in FIG. 3, there is a voltage pulsation (ΔEdc=±2.5 V).

When the pulsating frequency of the DC voltage is 300 Hz (that is, six times the power supply frequency 50 Hz), the 300-Hz component, which is equal to the voltage pulsating component, is superimposed on the q-axis current Iq.

A 10-Hz component is generated in the current iu, the 10-Hz frequency being the difference between the pulsating component 300 Hz and the motor rotation frequency 290 Hz. The peak value exceeds 100 A, and a beat phenomenon is generated.

Now, the configurations of the pulsating frequency estimating part 14 and pulsation suppression calculating part 15, which are features of the present invention, will be described.

Figure 4:
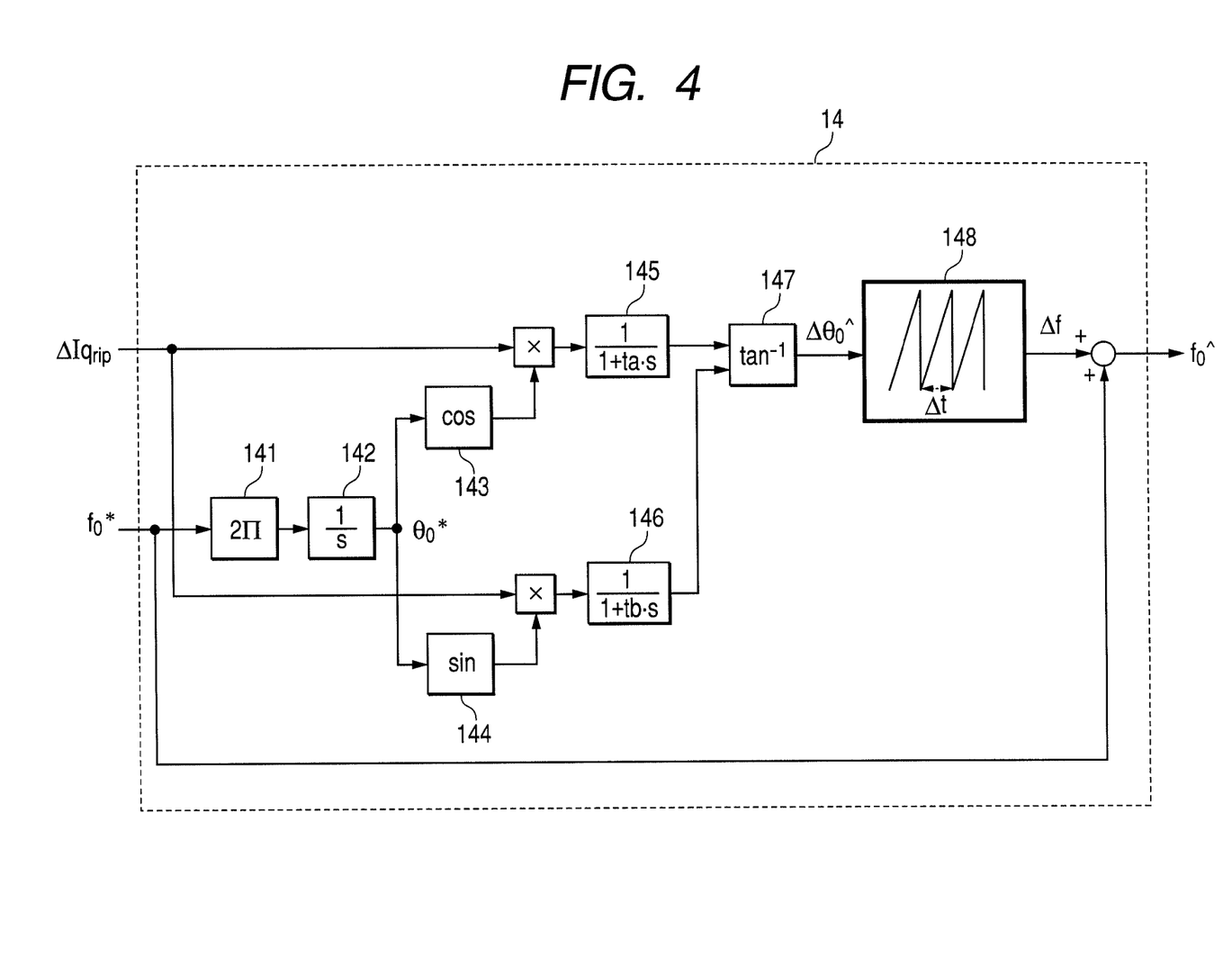
FIG. 4 is a block diagram showing the structure of a pulsating frequency estimating part 14 in the controller in FIG. 1.

The pulsating frequency estimating part 14 will be described with reference to FIG. 4.

A pulsating frequency setting $f_0^*$ output from the pulsating frequency setting part 13 is multiplied by a gain 141, which is a constant $2\pi$, and the multiplied value is input to an integrating part 142. An output signal $\theta_0^*$ ($=2\pi f_0^* \times t$) from the integrating part 142 is input to a cosine signal generating part 143 and a sine signal generating part 144.

An output signal from the cosine signal generating part 143 is multiplied by a high-frequency component $\Delta Iq_{rip}$ (a difference between the q-axis detected current value Iqc and the first current command value Iq*) included in the q-axis detected current value, and the multiplied value is then input to a primary delay calculating part 145. An output signal from the sine signal generating part 144 is also multiplied by the high-frequency component $\Delta Iq_{rip}$, and the multiplied value is then input to a primary delay calculating part 146.

The arctangent signal generating part 147 uses the output signals from the primary delay calculating parts 145 and 146 to calculate a phase signal $\Delta \hat{\theta}_0$.

The frequency error calculating part 148 receives the phase signal $\Delta \hat{\theta}_0$ and outputs $\Delta f$, which is a setting deviation in the pulsating frequency. The output signal is then added to the pulsating frequency setting $f_0^*$ to calculate an estimated pulsating frequency value $\hat{f}_0$.

Figure 5:
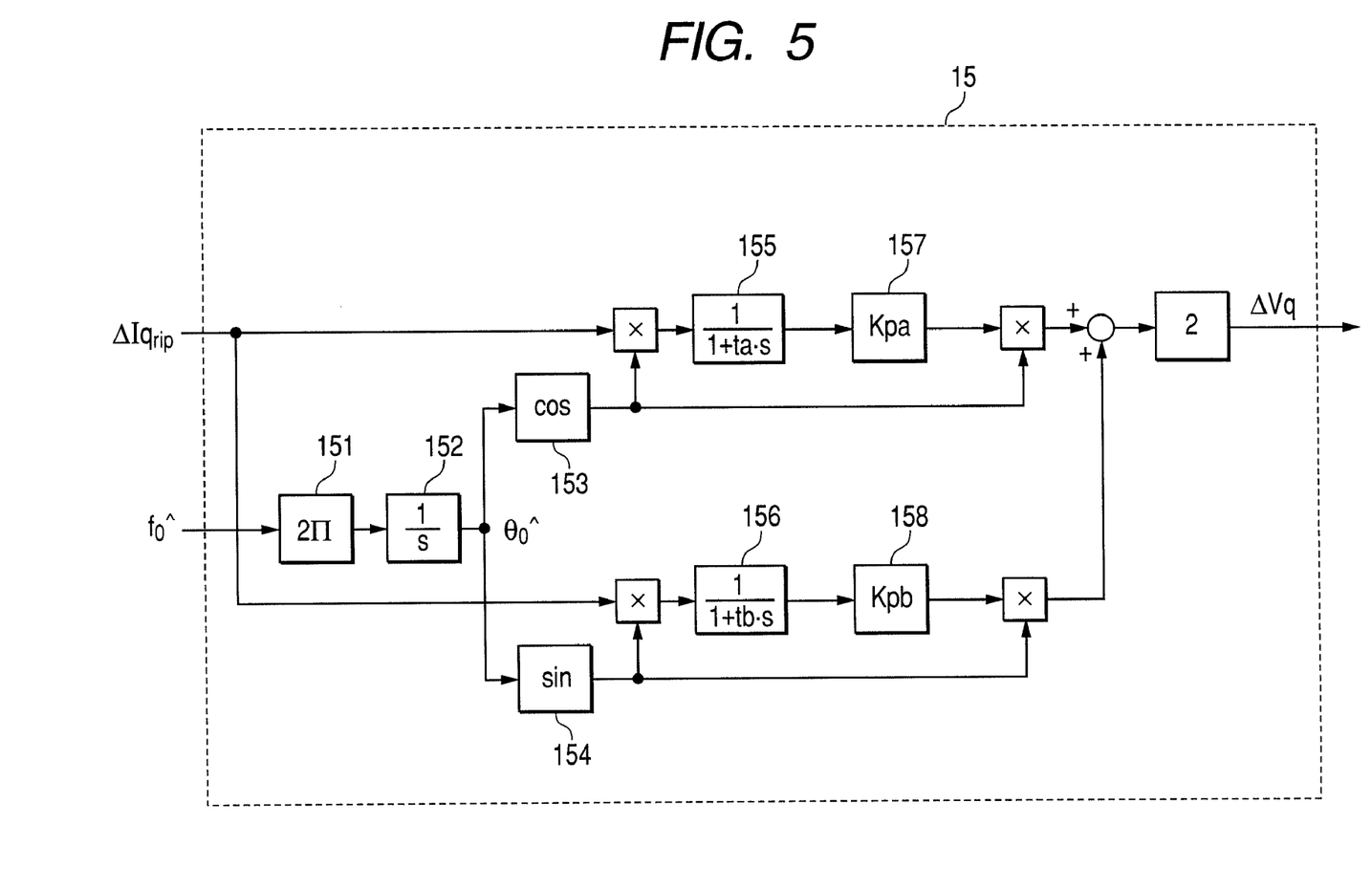
FIG. 5 is a block diagram illustrating a pulsation suppression calculating part 15 in the controller in FIG. 1.

The pulsation suppression calculating part 15 will be then described with reference to FIG. 5.

The estimated pulsating frequency value $\hat{f}_0$ is multiplied by a gain 151, which is a constant $2\pi$, and the multiplied value is input to an integrating part 152. An output signal $\theta_0^-$ ($=2\pi \hat{f}_0 \times t$) from the integrating part 152 is input to a cosine signal generating part 153 and a sine signal generating part 154.

An output signals from the cosine signal generating part 153 is multiplied by a high-frequency component $\Delta Iq_{rip}$ included in the q-axis detected current value, and the multiplied value is then input to a primary delay calculating parts 155. An output signals from the sine signal generating part 154 is also multiplied by the high-frequency component $\Delta Iq_{rip}$, and the multiplied value is then input to a primary delay calculating part 156.

Output signals from the primary delay calculating parts 155 and 156 are respectively multiplied by a proportional gain 157 of a constant Kpa and a proportional gain 158 of a constant Kpb.

The output signals from the cosine signal generating part 153 and sine signal generating part 154 are respectively multiplied by proportional gains 157 and 158 (output signals), and the multiplication results are added to each other. The added value is doubled and output as a q-axis pulsation compensating value $\Delta Vq$.

The principle of operation of the pulsating frequency setting part 13, pulsating frequency estimating part 14, and pulsation suppression calculating part 15, which are features of the present invention, will be described below.

First, a method of estimating the DC voltage pulsating frequency will be described.

The pulsating frequency setting part 13 multiplies the AC power supply voltage frequency (50 or 60 Hz) by 6, as indicated by equation (5), and tentatively sets the multiplied value as the pulsating frequency setting $f_0^*$.

[Equation 5]

$$f_0^* = 6 \cdot fz \quad (5)$$

where
fz: power supply frequency [Hz]

The pulsating frequency estimating part 14 estimates the pulsating frequency by calculation.

To control pulsation highly precisely when, for example, a different power supply frequency (50 or 60 Hz) is used or there is frequency error, the pulsating frequency must be estimated by calculation.

The high-frequency component $\Delta Iq_{rip}$ included in the q-axis detected current value Iqc is defined as in equation (6).

[Equation 6]

$$\Delta Iq_{rip} = \Delta Iq \cdot \sin(2\pi \cdot f_0 \cdot t) \quad (6)$$

where
$\Delta Iq$: Amplitude of the pulsating component $\Delta Iq_{rip}$ can be obtained as a difference between the q-axis detected current value Iqc and the first current command value Iq*, as indicated by equation (7).

[Equation 7]

$$\Delta Iq_{rip} = Iqc - Iq^* \quad (7)$$

When the tentative setting (initial value) of the pulsating frequency is $f_0^*$, if the values obtained by multiplying the output signals from the cosine signal generating part 143 and sine signal generating part 144 by $\Delta Iq_{rip}$ are respectively denoted $Ia_1$ and $Ib_1$, equation (8) holds.

[Equation 8]

$$\begin{bmatrix} Ia_1 \\ Ib_1 \end{bmatrix} = \Delta Iq_{rip} \begin{bmatrix} \cos(2\pi \cdot f_0^* \cdot t) \\ \sin(2\pi \cdot f_0^* \cdot t) \end{bmatrix} \quad (8)$$

$$= \frac{1}{2} \Delta Iq \begin{bmatrix} \sin[2\pi \cdot (f_0 + f_0^*) \cdot t] + \sin[2\pi \cdot (f_0 - f_0^*) \cdot t] \\ \cos[2\pi \cdot (f_0 - f_0^*) \cdot t] + \cos[2\pi \cdot (f_0 + f_0^*) \cdot t] \end{bmatrix}$$

If the signals $Ia_1$ and $Ib_1$ are respectively input to primary delay calculating parts 145 and 146, and primary delay constants (ta and tb) by which a summed frequency $[2\pi(f_0+f_0^*)]$ component can be removed is set, equation (8) can be approximated as in equation (9).

In equation (9), $\phi$ is a phase delay caused by a primary delay filter.

[Equation 9]

$$\begin{bmatrix} Ia_2 \\ Ib_{12} \end{bmatrix} = \frac{1}{2} \Delta Iq \begin{bmatrix} \sin[2\pi \cdot (f_0 - f_0^*) \cdot t - \varphi_2] \\ \cos[2\pi \cdot (f_0 - f_0^*) \cdot t - \varphi_2] \end{bmatrix} \quad (9)$$

The phase signal $\Delta \hat{\theta}_0$ signal obtained in the arctangent signal generating part 147 is represented by equation (10).

[Equation 10]

$$\Delta \hat{\theta}_0 = \tan^{-1}\left[\frac{Ia_2}{Iab}\right] \quad (10)$$

$$= 2\pi \cdot (f_0 - f_0^*) \cdot t - \varphi_2$$

Equation (10) indicates that when a differential frequency $[2\pi(f_0-f_0^*)]$ component is calculated, error between the pulsating frequency of the DC voltage and the pulsating frequency setting can be obtained.

Figure 6:
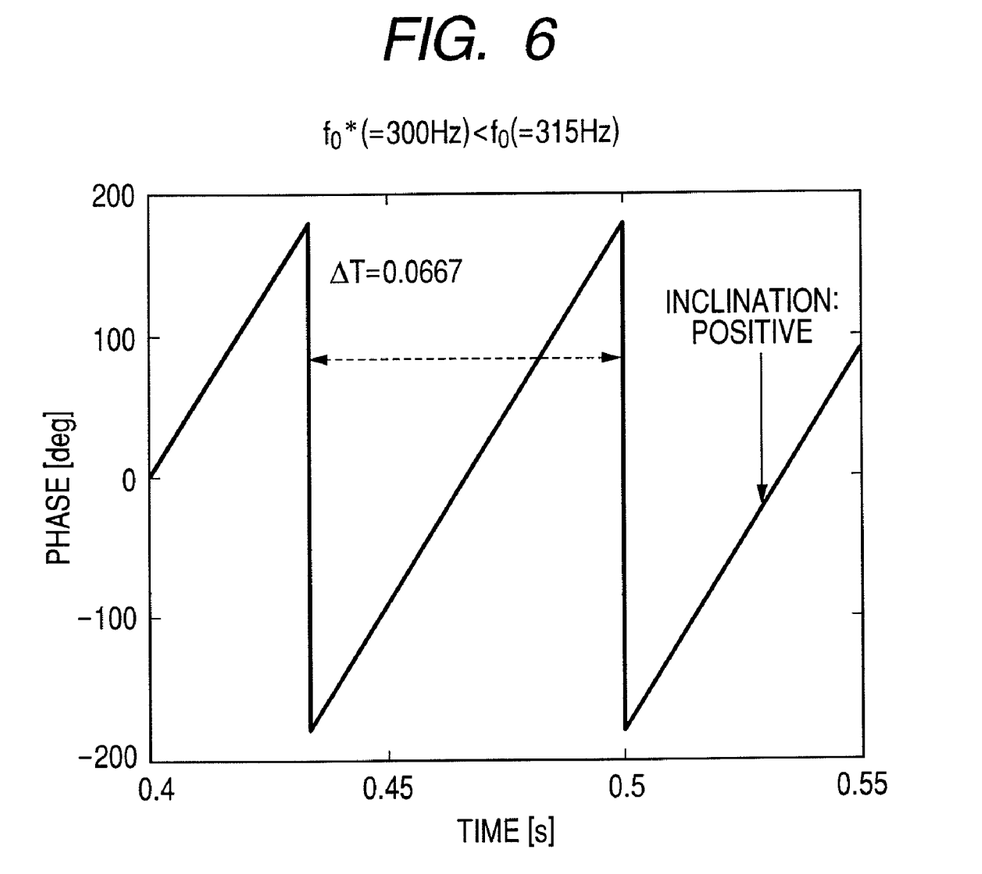
FIG. 6 is a drawing indicating a waveform of a phase signal when a pulsating frequency $f_0$ of a DC voltage is greater than a pulsating frequency setting $f_0^*$.

The frequency error calculating part 148 will be then described in detail. FIG. 6 shows a waveform of the phase signal $\Delta\theta_0\hat{}$ when the pulsating frequency $f_0$ of the DC voltage is 315 Hz and the pulsating frequency setting $f_0^*$ is 300 Hz.

The drawing indicates that the cycle T of the signal $\Delta\theta_0\hat{}$ is 0.0667 second (=1/15 Hz).

It can also be seen that the inclination of the signal $\Delta\theta_0\hat{}$ is positive and $f_0$ is greater than $f_0^*$.

That is, it can be seen that when a cyclic nature is checked during a period in which the signal $\Delta\theta_0\hat{}$ changes from +180° to −180° (time is measured), the value of the setting error can be determined and that when the inclination of the signal $\Delta\theta_0\hat{}$ is checked, the polarity of the setting error can be estimated.

Figure 7:
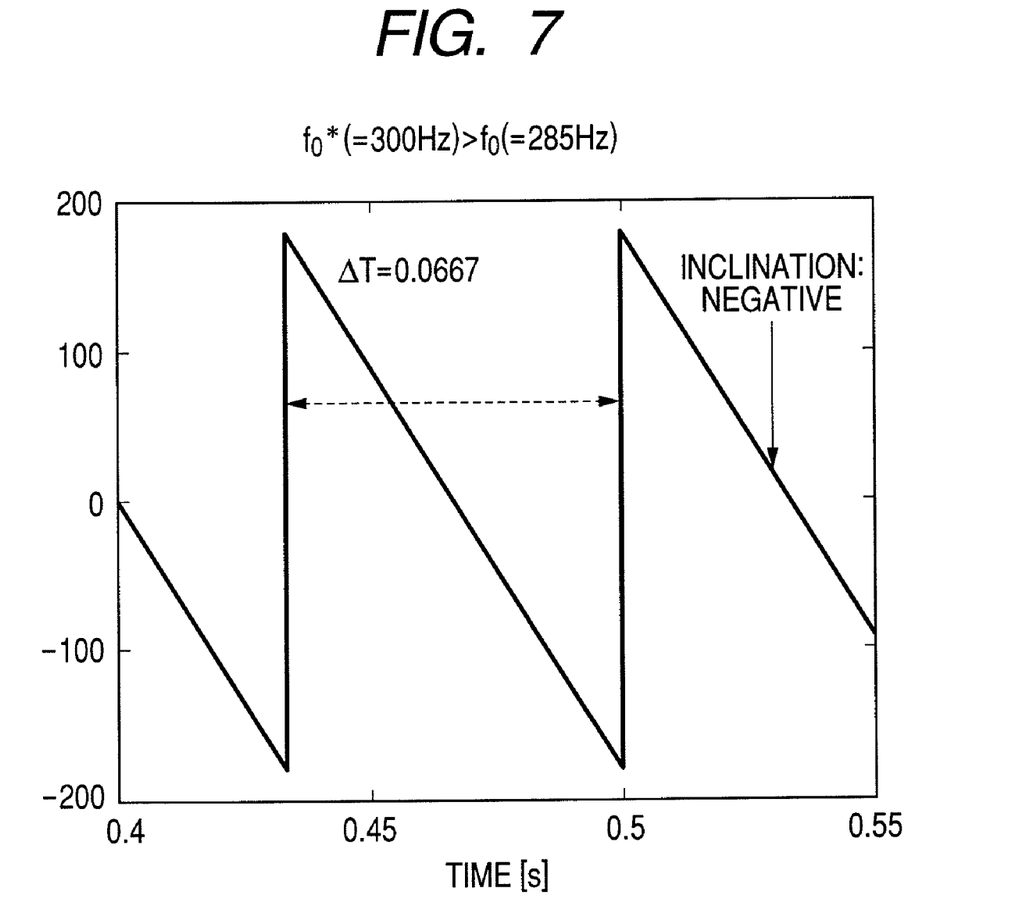
FIG. 7 is a drawing indicating a waveform of a phase signal when the pulsating frequency $f_0$ of the DC voltage is smaller than the pulsating frequency setting $f_0^*$.

FIG. 7 shows a waveform of the phase signal $\Delta\theta_0\hat{}$ when the pulsating frequency $f_0$ of the DC voltage is 285 Hz and the pulsating frequency setting $f_0^*$ is 300 Hz.

As in FIG. 6, it can be seen that the cycle T of the signal $\Delta\theta_0\hat{}$ is 0.0667 second (=1/15 Hz), the inclination of the signal $\Delta\theta_0\hat{}$ is negative, and $f_0$ is smaller than $f_0^*$.

That is, $\Delta f$, which is a setting deviation in the pulsating frequency, is calculated according to the information described above and added to the pulsating frequency setting $f_0^*$ to calculate the estimated pulsating frequency value $f_0\hat{}$.

When the estimated value $f_0\hat{}$ is substituted for the pulsating frequency setting $f_0^*$, if $\Delta f$, which is an output from the frequency error calculating part 148, is 0 for a prescribed period, the estimated value $f_0\hat{}$ is stored in a memory in a microprocessor. The stored estimated value $f_0\hat{}$ may be read and used as the output value from the pulsating frequency estimating part 14 in the subsequent activations (control operation), without having the pulsating frequency setting part 13 and 14 perform calculation.

The pulsation suppression calculating part 15 controls pulsation suppression.

If results obtained by multiplying the output signals from the cosine signal generating part 153 and sine signal generating part 154, which are calculated by using the estimated pulsating frequency value $f_0\hat{}$, by the signal $\Delta Iq_{rip}$ are denoted $Ia_3$ and $Ib_3$, equation (11) holds.

[Equation 11]

$$\begin{bmatrix} Ia_3 \\ Ib_3 \end{bmatrix} = \Delta Iq_{rip} \begin{bmatrix} \cos(2\pi \cdot \hat{f}_0 \cdot t) \\ \sin(2\pi \cdot \hat{f}_0 \cdot t) \end{bmatrix} \quad (11)$$

$$= \frac{1}{2}\Delta Iq \begin{bmatrix} \sin[2\pi \cdot (f_0 + \hat{f}_0) \cdot t] + \sin[2\pi \cdot (f_0 - \hat{f}_0) \cdot t] \\ \cos[2\pi \cdot (f_0 - \hat{f}_0) \cdot t] + \cos[2\pi \cdot (f_0 + \hat{f}_0) \cdot t] \end{bmatrix}$$

If the signals Ia3 and Ib3 are respectively input to primary delay calculating parts 155 and 156, and the primary delay constants (ta and tb) by which the summed frequency $[2\pi(f_0+f_0^*)]$ component can be removed is set, equation (11) can be approximated as in equation (12).

In equation (12), $\phi 4$ is a phase delay caused by the primary delay filter.

[Equation 12]

$$\begin{bmatrix} Ia_4 \\ Ib_4 \end{bmatrix} = \frac{1}{2}\Delta Iq \begin{bmatrix} \sin[2\pi \cdot (f_0 - \hat{f}_0) \cdot t - \varphi_4] \\ \cos[2\pi \cdot (f_0 - \hat{f}_0) \cdot t - \varphi_4] \end{bmatrix} \quad (12)$$

The signals $Ia_4$ and $Ib_4$ are multiplied by a proportional gain Kp (Kp=Kpa=Kpb) and calculation in equation (13) is performed, equation (13) holds.

[Equation 13]

$$\Delta Vq = Kp \cdot \Delta Iq \cdot 2 \cdot [Ia_4 \cdot \cos(2\pi \cdot \hat{f}_0 \cdot t) + Ib_4 \cdot \cos(2\pi \cdot \hat{f}_0 \cdot t)] \quad (13)$$

$$= Kp \cdot \Delta Iq \cdot 2 \cdot [\sin[2\pi \cdot (f_0 - \hat{f}_0) \cdot t - \varphi_4] \cdot \cos(2\pi \cdot \hat{f}_0 \cdot t) +$$

$$\cos[2\pi \cdot (f_0 - \hat{f}_0) \cdot t - \varphi_4] \times \cos(2\pi \cdot \hat{f}_0 \cdot t)]$$

$$= Kp \cdot \Delta Iq \cdot \sin(2\pi \cdot (f_0 \cdot t - \varphi_4)$$

It can be seen that the pulsating frequency $f_0$ component, $[\Delta Iq \times \sin(2\pi \times f_0 \times t - \phi 4)]$, is amplified by the proportional gain Kp.

When the calculated value $\Delta Vq$ is added to the q-axis voltage control value Vq* and feedback control for calculating an inverter output voltage is performed, the beat phenomenon can be suppressed.

Figure 8:
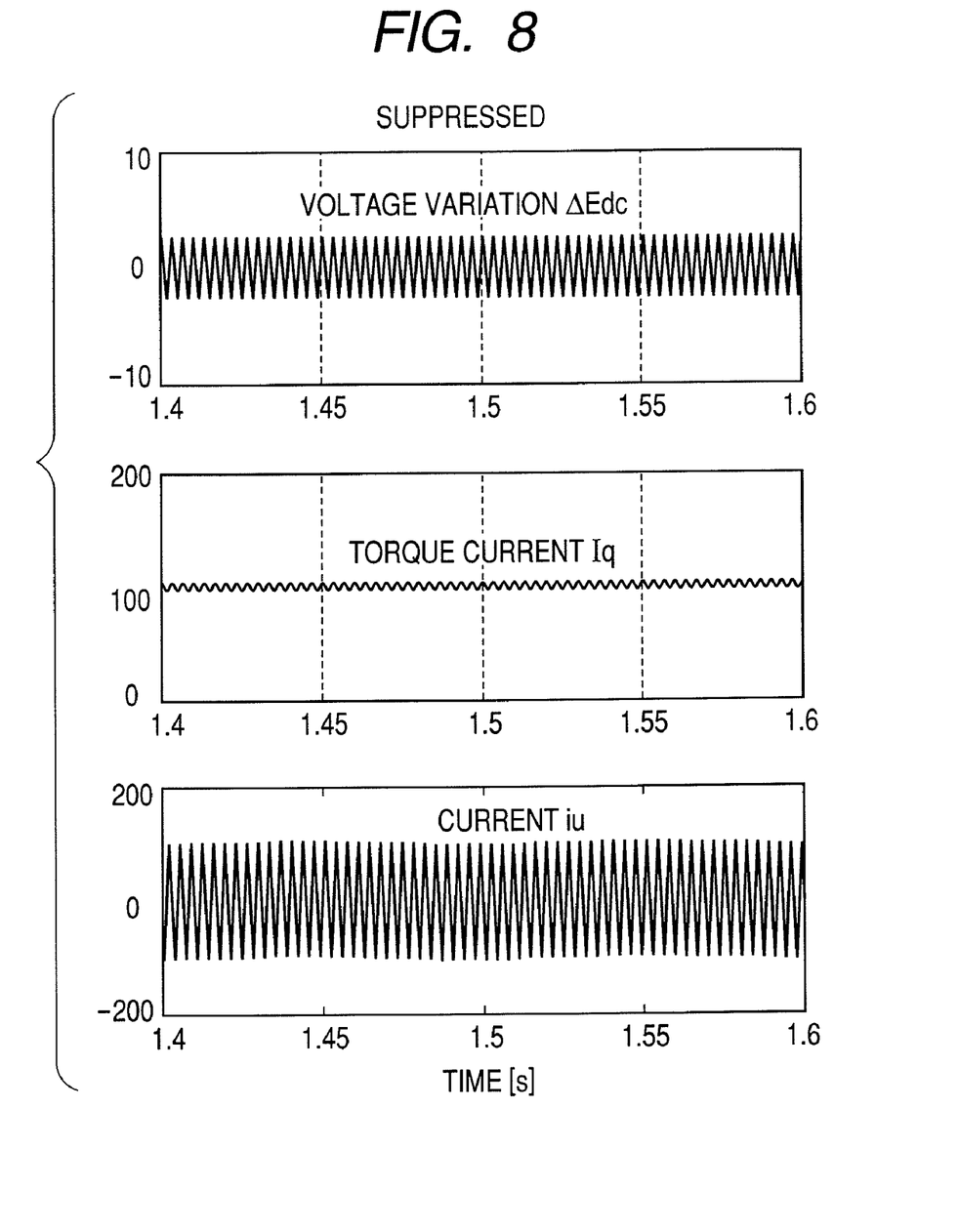
FIG. 8 is a drawing illustrating current control characteristics when the present invention is applied (there is pulsation in a DC voltage).

FIG. 8 illustrates characteristics when a compensation is made for suppressing the beat phenomenon.

The drawing indicates that since a compensation for suppression is added, the beat phenomenon is suppressed even when there is a voltage pulsation ($\Delta Edc=\pm 2.5$ V), unlike the characteristics in FIG. 2 (a compensation for suppression is not made).

Although, in this embodiment, the frequency error calculating part 148 provided in the pulsating frequency estimating part 14 has estimated the pulsating frequency by calculation, a phase locked loop (PLL) control calculating part may be substituted to perform the estimation by calculation.

Figure 9:
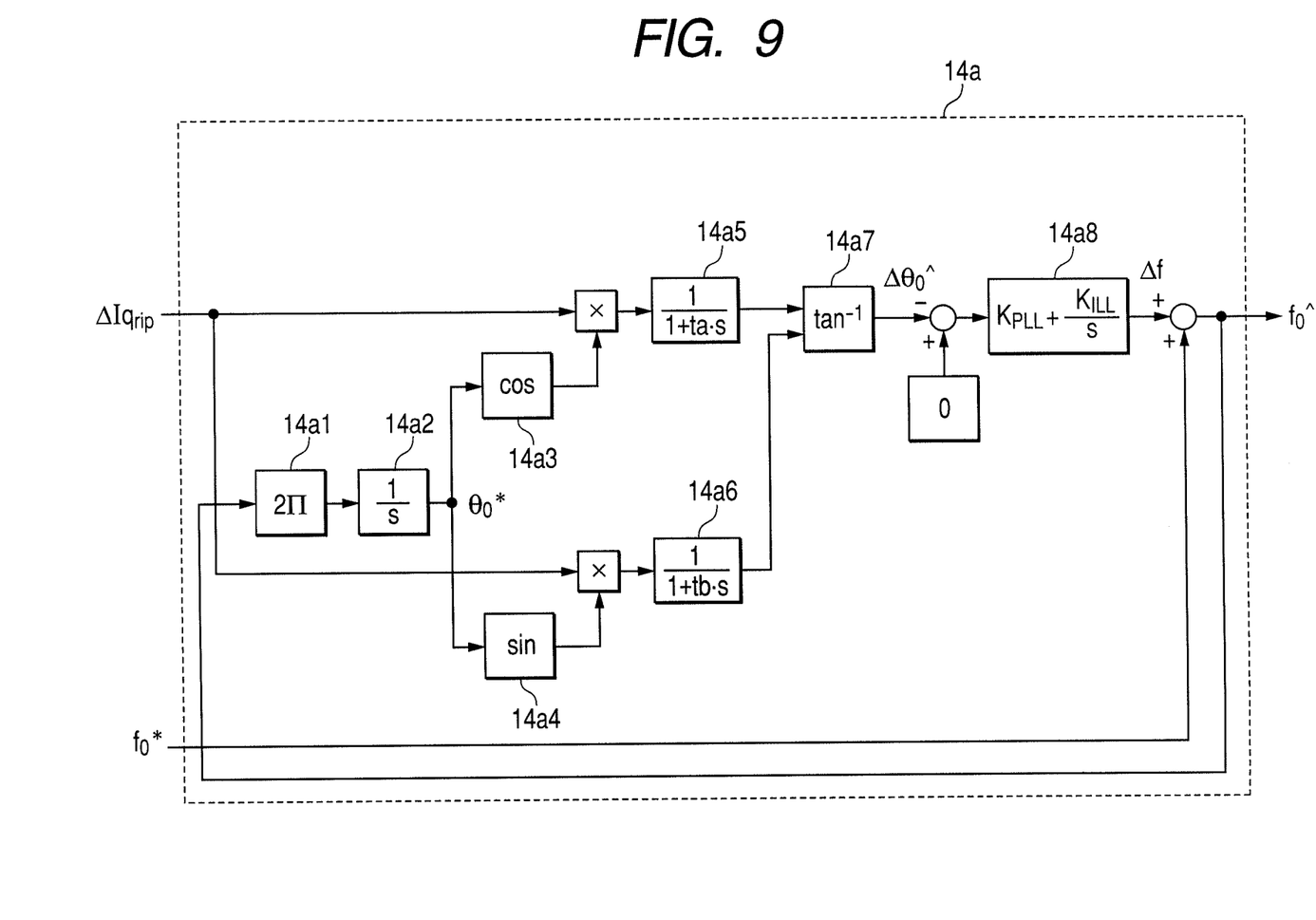
FIG. 9 is a block diagram of a structure when phase locked loop (PLL) control is applied to the pulsating frequency estimating part 14.

FIG. 9 shows the structure of a pulsating frequency estimating part 14a that is a substitute for the pulsating frequency estimating part 14.

In the pulsating frequency estimating part 14a, a pulsating frequency setting $f_0\hat{}$ described later, instead of the pulsating frequency setting $f_0^*$, is multiplied by a gain 14a1, which is a constant $2\pi$, and the multiplied value is input to an integrating part 14a2.

An output signal $\theta_0^*$ (=$2\pi f_0\hat{} \times t$) from the integrating part 14a2 is input to a cosine signal generating part 14a3 and a sine signal generating part 14a4.

An output signal from the cosine signal generating part 14a3 is multiplied by a high-frequency component $\Delta Iq_{rip}$ (a difference between the q-axis detected current value Iqc and the first current command value Iq*) included in the q-axis detected current value, and the multiplied value is then input to a primary delay calculating part 14a5. An output signal from the sine signal generating part 14a4 is also multiplied by the high-frequency component $\Delta Iq_{rip}$, and the multiplied value is then input to a primary delay calculating part 14a6.

The arctangent signal generating part 14a7 uses the output signals from the primary delay calculating parts 14a5 and 14a6 to calculate a phase signal $\Delta\theta_0\hat{}$.

The PLL control calculating part 14a8 performs proportional calculation and integration and outputs Δf, which is a pulsating frequency setting deviation, so that $\Delta\theta_0\hat{}$ becomes 0.

In FIG. 9, $K_{PLL}$ is a proportional gain and $K_{ILL}$ is an integral gain. The signal Δf is added to the pulsating frequency setting $f_0^*$ to calculate the estimated pulsating frequency value $f_0\hat{}$.

In this embodiment, the pulsation suppression calculating part 15 has performed proportional control, but it should be understood that integral control may be substituted to suppress the beat phenomenon.

Figure 10:
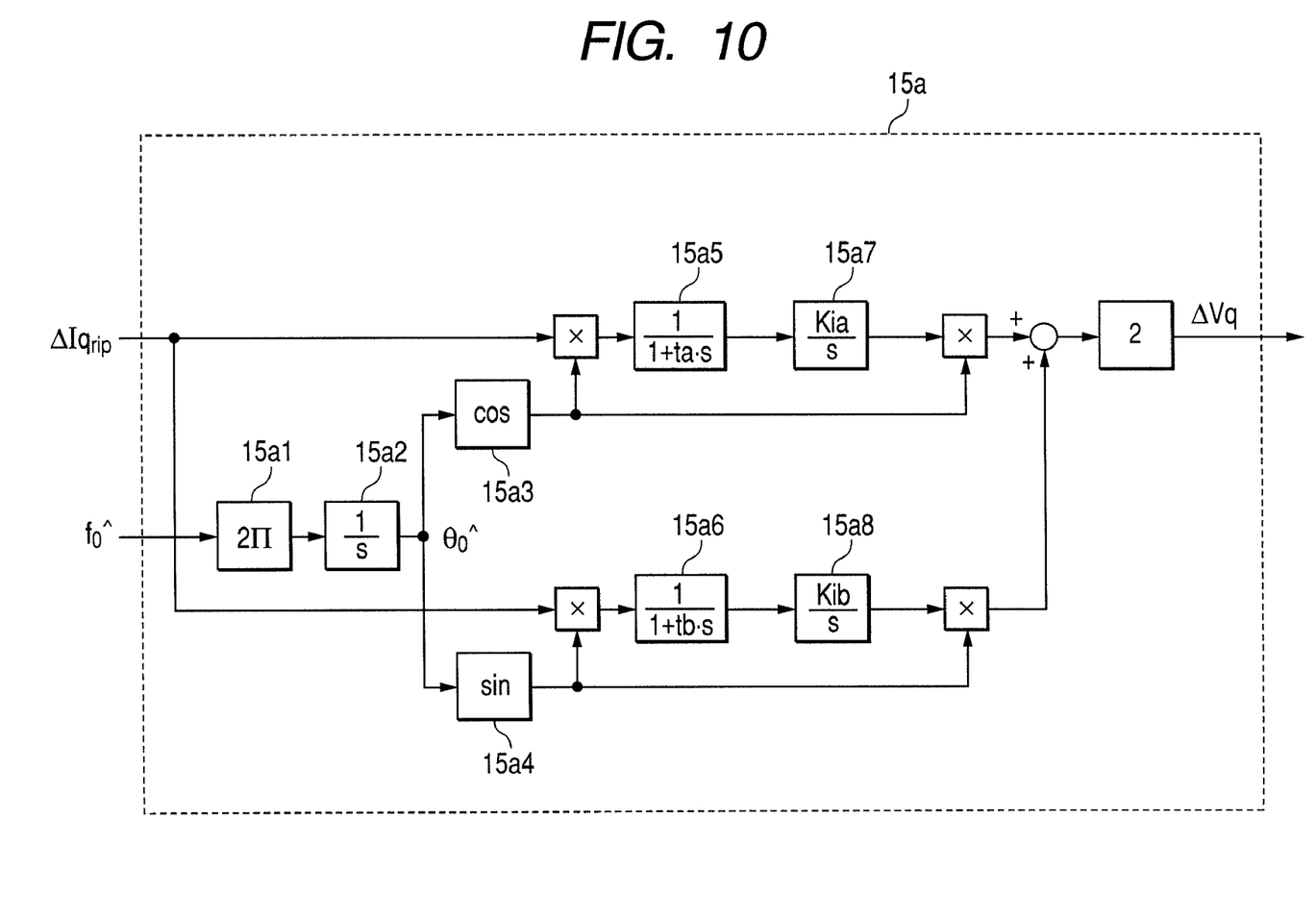
FIG. 10 is a block diagram of a structure when integral control is applied to the pulsation suppression calculating part 15.

FIG. 10 shows the structure of a pulsation suppression calculating part 15a that is a substitute for the pulsation suppression calculating part 15.

The estimated pulsating frequency value $f_0\hat{}$ is multiplied by a gain 15a1, which is a constant 2π, and the multiplied value is input to an integrating part 15a2. An output signal from the integrating part 15a2 is input to a cosine signal generating part 15a3 and a sine signal generating part 15a4.

An output signal from the cosine signal generating part 15a3 is multiplied by a high-frequency component $\Delta Iq_{rip}$ included in the q-axis detected current value, and the multiplied value is then input to a primary delay calculating parts 15a5. An output signal from the sine signal generating part 15a4 is also multiplied by the high-frequency component $\Delta Iq_{rip}$, and the multiplied values are then input to a primary delay calculating parts 15a5 and 15a6.

An output signal from the primary delay calculating part 15a5 is input to an integrating part 15a7 having an integral gain, which is a constant Kia, and an output signal from the primary delay calculating part 15a6 is input to an integrating part 15a8 having an integral gain, which is a constant Kib. The output signals from the cosine signal generating part 15a3 and sine signal generating part 15a4 are respectively multiplied by output signals from the integrating parts 15a7 and 15a8, and the multiplication results are added to each other. The added value is doubled and output as a q-axis pulsation compensating value ΔVq.

In this embodiment, the q-axis detected current value Iqc has been used to calculate the q-axis pulsation compensating value ΔVq so as to compensate the q-axis voltage command value Vq*, but it should be understood that the d-axis detected current value Idc may be substituted to calculate the d-axis pulsation compensating value ΔVd so as to compensate the d-axis voltage command value Vd*.

Pulsation suppression may be performed simultaneously on both the d-axis and q-axis.

Second Embodiment

Although, in the method in the first embodiment, a three-phase AC voltage has been input to a diode rectifying circuit, the present invention can also be applied to a method in which a single-phase AC voltage is input.

Figure 11:
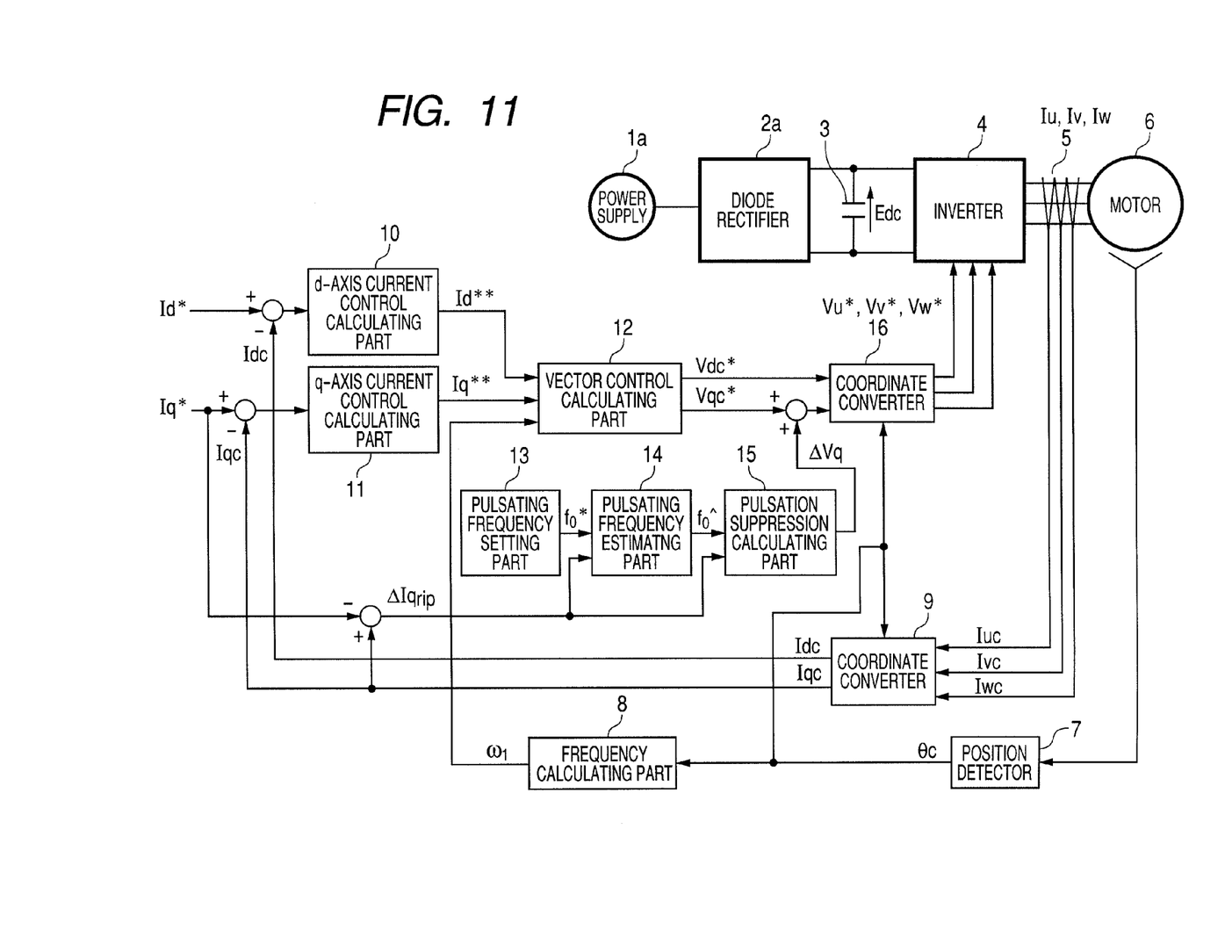
FIG. 11 is a block diagram showing the structure of a beat-less controller for a permanent magnet motor in another embodiment of the present invention.

FIG. 11 shows an embodiment for this method.

The elements having reference numerals 3 to 16 in the drawing are identical to the elements having the same reference numerals in FIG. 1.

The AC power supply 1a outputs a single-phase AC voltage to a diode rectifier 2a.

The diode rectifier 2a converts the single-phase AC voltage to a DC voltage.

The pulsating frequency setting part 13a doubles the power supply frequency (50 or 60 Hz) of the AC voltage and tentatively sets the double value as the pulsating frequency setting $f_0^*$, as indicated by equation (14).

[Equation 14]

$$f_0^* = 2 \cdot fz \quad (14)$$

Also in the embodiment in which a single-phase AC voltage power supply is used, it is apparent that the effect that the beat phenomenon is suppressed is provided.

Third Embodiment

Although, in the method in the first embodiment, the position detector 7 has been used to detect the position of the permanent magnet motor 6, the present invention can also be applied to a controller that lacks a position sensor.

Figure 12:
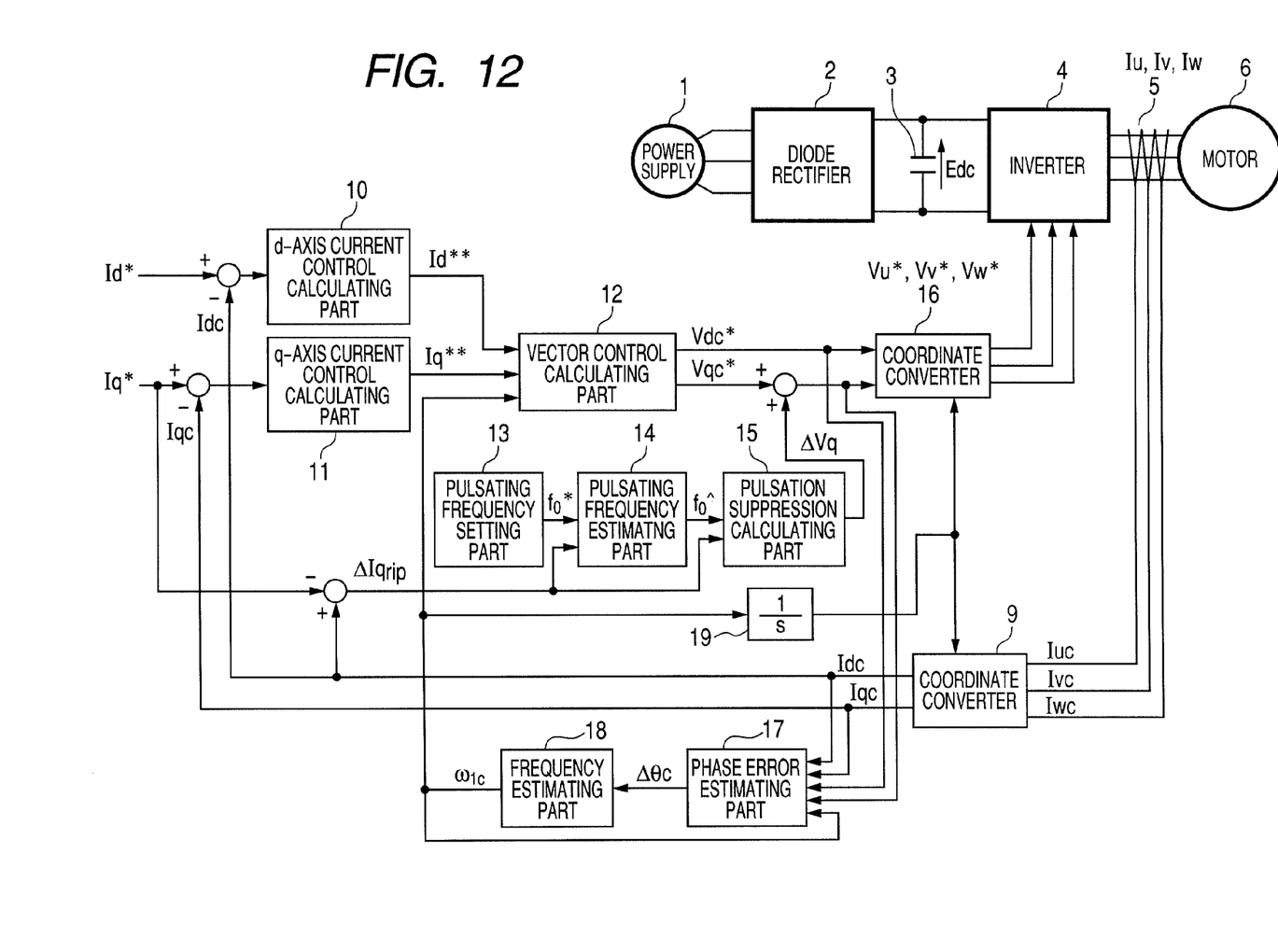
FIG. 12 is a block diagram showing the structure of a beat-less controller for a permanent magnet motor in yet another embodiment of the present invention.

FIG. 12 shows an embodiment of this type of controller.

The elements having reference numerals 1 to 6 and 9 to 16 in the drawing are identical to the elements having the same reference numerals in FIG. 1.

The phase error estimating part 17 uses the d-axis voltage command value Vdc*, a sum of the q-axis voltage command value Vqc* and the q-axis pulsation compensating value ΔVq, and the d-axis and q-axis detected current values Idc and Iqc to estimate axis error $\Delta\theta(=\theta c^* - \theta)$ between the estimated position value θc* and the position of the motor θ according to equation (15), and outputs the estimated phase error Δθc.

[Equation 15]

$$\Delta\theta_0 = \tan^{-1}\left[\frac{Vdc^* - R^* \cdot Idc + \omega_1 c \cdot Lq^* \cdot Iqc}{Vqc^* - R^* \cdot Iqc - \omega_1 c \cdot Lq^* \cdot Idc}\right] \quad (15)$$

The frequency estimating part 18 calculates an estimated frequency value $\omega_1 c$ so that the estimated phase error Δθc becomes 0.

The phase calculating part 19 integrates the estimated frequency value $\omega_1 c$ to produce a phase command value.

Although this type of system having no position sensor has an inexpensive structure, the system can also operate in the same way as in the above embodiments and provide the same effect.

In the first to third embodiments, the first current command values Id* and Iq* and the detected current values Idc and Iqc have been used to generate the second current command values Id and Iq**, and the generated current command values have been used to perform calculation for vector control. However, it is also possible to apply the present invention to:

1) a vector control calculation method in which the first current command values Id and Iq* and the detected current values Idc and Iqc are used to generate voltage compensated values ΔVd* and ΔVq* and the generated voltage compensated values ΔVd* and ΔVq*, the first current command values Id* and Iq*, the frequency calculating value $\omega_1$, and the electric constants of the motor 6 are used to calculate the voltage command values Vdc* and Vqc* according to equation (16), and 2) a vector control calculation method in which the first d-axis current command value Id* (=0), the primary delay signal $Iqc_{td}$ of the detected q-axis current value Iqc, the speed command value $\omega_r^*$, and the electric constants of the motor 6 are used to calculate the voltage command values Vdc* and Vqc* according to equation (17).

[Equation 16]

$$\begin{bmatrix} Vdc^* \\ Vqc^* \end{bmatrix} = \begin{bmatrix} R^* & -\omega_1 L^* \\ \omega_1 \cdot Ld^* & R^* \end{bmatrix} \cdot \begin{bmatrix} Id^* \\ Iq^* \end{bmatrix} + \begin{bmatrix} 0 \\ \omega_1 \cdot Ke^* \end{bmatrix} + \begin{bmatrix} \Delta Vd^* \\ \Delta Vq^* \end{bmatrix} \quad (16)$$

-continued

[Equation 17]

$$\begin{bmatrix} Vdc^* \\ Vqc^* \end{bmatrix} = \begin{bmatrix} R^* & -\omega_r^* \cdot L^* \\ \omega_r \cdot Ld^* & R^* \end{bmatrix} \cdot \begin{bmatrix} Id^* \\ Iqc_{+d} \end{bmatrix} + \begin{bmatrix} 0 \\ \omega_r \cdot Ke^* \end{bmatrix} \quad (17)$$

In the methods in the first to third embodiments, an expensive current detector 5 has been used to detect three-phase AC currents Iu, Iv, and Iw. However, the present invention can also be applied to a low-cost system in which a DC current flowing in a one shunt resistor mounted to detect an overcurrent in the inverter 4 is used to reproduce three-phase motor currents Iuˆ, Ivˆ, and Iwˆ and the reproduced current values are used.

What is claimed is:

1. A permanent magnet motor controller that converts a DC voltage, which is an output from a smoothing capacitor connected to an output side of a rectifier for rectifying a single- or three-phase power supply voltage and obtaining a DC voltage, to a desired AC voltage, and controls a voltage output from an inverter, which drives a permanent magnet motor, according to a calculated value of a pulsating frequency of the DC voltage, a motor constant setting, and an output value, used in current control, that is calculated so that a current value detected in an inverter matches a current command value supplied from upstream, wherein the pulsating frequency of the DC voltage is estimated from the current value detected in the inverter.

2. The permanent magnet motor controller according to claim 1, wherein in a method of estimating the pulsating frequency of the DC voltage:
   an integer multiple of a power supply frequency setting, initial value, is used to calculate a pulsating frequency setting;
   a sine signal and a cosine signal are generated from a phase value obtained by integrating the calculated pulsating frequency setting;
   an arctangent (tan$^{-1}$) calculation is performed by using a signal obtained by applying low-pass filter processing on a value resulting from a multiplication of the cosine signal by a difference in current or a detected value and a signal obtained by applying low-pass filter processing on a value resulting from a multiplication of the sine signal by a difference in current or a detected value;
   a value of error between the pulsating frequency of the DC voltage and the pulsating frequency setting is calculated from a cyclic nature of a calculated value obtained in the arctangent calculation;
   a polarity of the error is obtained from an inclination of the calculated value; and
   the above information and the pulsating frequency setting are used for calculation.

3. The permanent magnet motor controller according to claim 1, wherein in a method of estimating the pulsating frequency of the DC voltage:
   setting error between a pulsating frequency setting and a DC voltage pulsating frequency is estimated;
   a sine signal and a cosine signal are generated from a phase value obtained by integrating a value resulting from an addition of the setting error and the pulsating frequency setting;
   an arctangent (tan$^{-1}$) calculation is performed by using a signal obtained by applying low-pass filter processing on a value resulting from a multiplication of the cosine signal by a difference in current or a detected value and a signal obtained by applying low-pass filter processing on a value resulting from a multiplication of the sine signal by a difference in current or a detected value;
   a phase signal of the setting error is calculated; and
   a proportional and integral calculation is performed to have the phase signal approach 0; and
   values obtained by the calculation and the pulsating frequency setting are mutually added.

4. The permanent magnet motor controller according to claim 1, wherein:
   the estimated pulsating frequency value is used as a new pulsating frequency setting;
   the estimated pulsating frequency value is stored when error between the estimated pulsating frequency value and the pulsating frequency setting remains 0 for a prescribed period; and
   the stored estimated pulsating frequency value is referenced in subsequent operations.

5. The permanent magnet motor controller according to claim 1, wherein:
   a sine signal and a cosine signal are generated from a phase value obtained by integrating a pulsating frequency setting or the estimated pulsating frequency value;
   the cosine signal is multiplied by a proportional multiple of a signal obtained by applying low-pass filter processing on a value resulting from a multiplication of the cosine signal by a difference in current or a detected value;
   the sine signal is multiplied by a proportional multiple of a signal obtained by applying low-pass filter processing on a value resulting from a multiplication of the sine signal by a difference in current or a detected value; and
   a value resulting from an addition of a value obtained by multiplying the cosine signal and a value obtained by multiplying the sine signal is used to compensate the inverter output voltage value.

6. The permanent magnet motor controller according to claim 1, wherein:
   a sine signal and a cosine signal are generated from a phase value obtained by integrating a pulsating frequency setting or the estimated pulsating frequency value;
   the cosine signal is multiplied by a value obtained by integrating a signal obtained by applying low-pass filter processing on a value resulting from a multiplication of the cosine signal by a difference in current or a detected value;
   the sine signal is multiplied by a value obtained by integrating a signal obtained by applying low-pass filter processing on a value resulting from a multiplication of the sine signal by a difference in current or a detected value; and
   a value resulting from an addition of a value obtained by multiplying the cosine signal and a value obtained by multiplying the sine signal is used to compensate the inverter output voltage value.

7. The permanent magnet motor controller according to claim 5, wherein at least either of a d-axis detected current value and a q-axis detected current value is used for a calculation in the compensation of the inverter output voltage value.

8. The permanent magnet motor controller according to claim 6, wherein at least either of a d-axis detected current value and a q-axis detected current value is used for a calculation in the compensation of the inverter output voltage value.

9. The permanent magnet motor controller according to claim 1, wherein:

the permanent magnet motor controller is a beat-less controller for a permanent magnet motor; and a pulsating frequency setting is twice a power supply frequency when a single-phase AC voltage is used, or six times the power supply frequency when a three-phase AC voltage is used.

10. The permanent magnet motor controller according to claim 1, wherein:

the permanent magnet motor controller is a beat-less controller for a permanent magnet motor; and the calculated value of the pulsating frequency of the DC voltage is obtained by estimating phase error by calculation, which is a difference between a rotation phase command value for an electric power converter and a rotation phase value of the permanent magnet motor, the calculation being performed so that the estimated phase error becomes 0.

* * * * *